Aug. 9, 1938.                 D. ELLIOTT                 2,125,996
GLARE ELIMINATOR
Filed Oct. 3, 1936
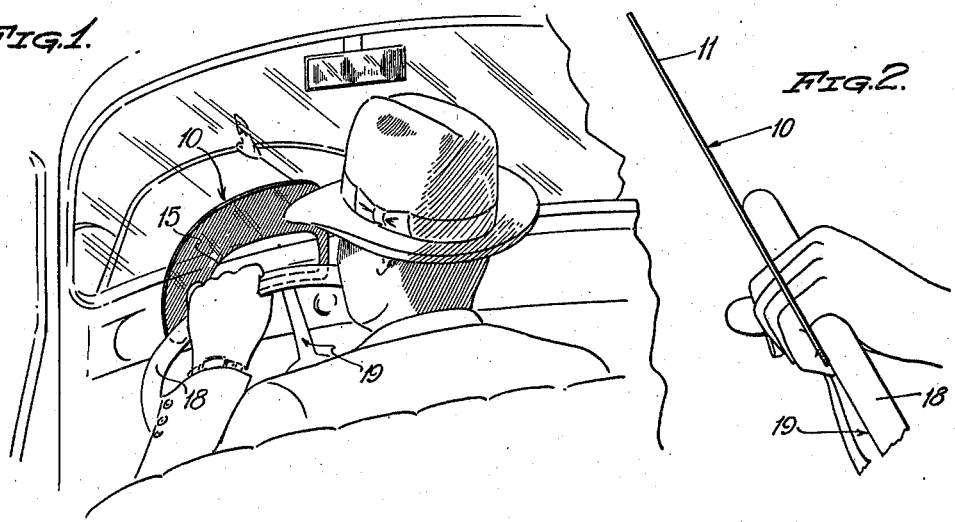
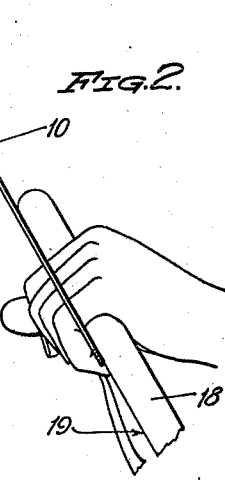
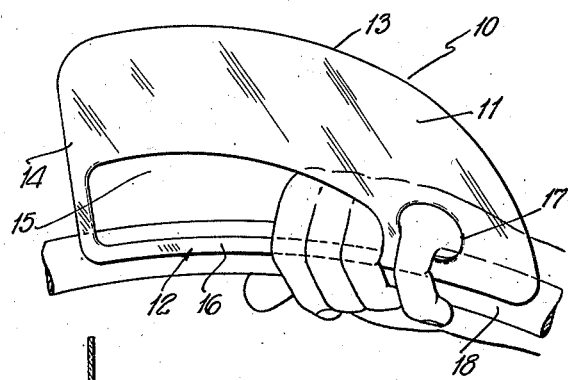
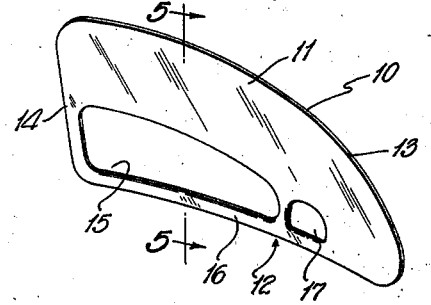
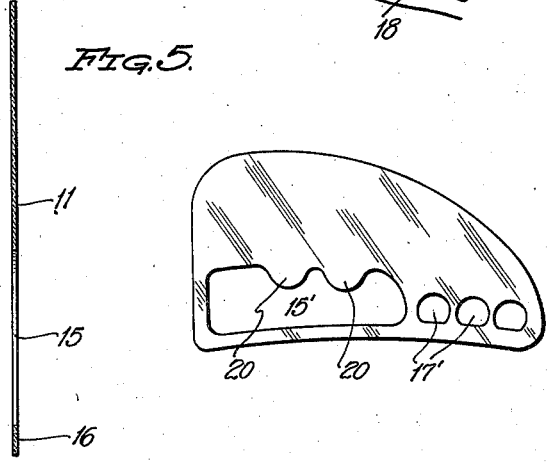
DAVID ELLIOTT.
INVENTOR.
BY *Ely & Pattison*
ATTORNEYS.
WITNESS:

Patented Aug. 9, 1938

2,125,996

UNITED STATES PATENT OFFICE 2,125,996

GLARE ELIMINATOR

David Elliott, Johnstown, Pa., assignor of one-half to Harry A. Israel, Lynn, Mass..

Application October 3, 1936, Serial No. 103,861

3 Claims. (Cl. 2—11)

This invention relates to improvements in glare eliminators for use by the drivers of motor vehicles.

One of the main objects of the invention resides in an anti-glare device for use by motorists during night driving to eliminate the danger of accidents caused by the glare of the headlights of approaching motor vehicles.

Another feature of the invention is to provide an anti-glare device which may be grasped by one of the hands of the driver of a motor vehicle without interfering with the grip upon the steering wheel or with the operation thereof, the device being so positioned within the line of vision of the driver as to shield his or her eyes from light glare, and which enables the rapid and easy shifting of the device to follow the glare as the motor vehicle approaches, and to permit clear vision by the driver when the road ahead is clear of approaching motor vehicles.

A further object of the invention is the provision of an anti-glare device which functions in the manner of an eye shade or visor, which is constructed of colored Celluloid or other like semi-opaque material, the same being sufficiently rigid to extend beyond the top of the steering wheel when held thereagainst by the hand of the operator.

A further feature of the invention is the provision of an anti-glare device having sufficient anti-glare area to shield the eyes of the driver and which contains therein, a peep opening by which the driver may have clear vision of the road ahead by a slight shift of his head without changing the location of the device.

Another feature of the invention is to provide a glare eliminator for motorists which is simple and inexpensive of construction, which will enable an advertiser to place an advertisement thereon and distribute the same for advertising purposes.

Other objects of the invention will appear as the following specification is read in conjunction with the accompanying drawing, in which:

Figure 1 is a perspective view of my glare eliminator in use.

Figure 2 is a side elevational view of the device in a held position against the steering wheel of a motor vehicle.

Figure 3 is a front elevational view of the device as illustrated in Figure 2.

Figure 4 is a perspective view of the anti-glare eliminator per se.

Figure 5 is an enlarged vertical sectional view on the line 5—5 of Figure 4.

Figure 6 is a side elevational view of a modified form of the invention.

Referring to the drawing by reference characters, the numeral 10 designates my glare eliminator in its entirety, and which comprises a flat stiff body 11 constructed of colored semi-opaque material such as Celluloid or the like. The colors of material from which the body is constructed may be green, amber, or other soft color, and the characteristics of the material is such that the body 11 is dull to the vision, although transparent to such an extent that it may seen through. However, the colored material arrests the intense light rays which may attempt to penetrate the same, in the same manner as an ordinary Celluloid eye shade.

The body 11 is of substantially triangular shape in side elevation, although the base edge 12 is concavely curved while the side edge 13 is convexly curved, the other edge of the body being substantially straight and designated by the numeral 14. The corners of the body are rounded as are all the exposed edges to prevent possible cutting of the hand when brought in contact therewith.

The body 11 is provided with a combined peep and hand grip opening 15 which is disposed adjacent the side edge 14 and the base edge 12, the lower wall of the opening 15 being substantially parallel to the base edge 12 to provide a finger grip strip 16. The opening 15 narrows in width inwardly from the edge 14 and terminates short of the side edge 13 to provide a space in the body 11 for a finger opening 17. The smaller opening 17 is so spaced from the larger opening 15 that the little finger of the left hand of a motorist may be inserted therethrough with the other three fingers extending through the adjacent end of the larger opening 15 for grasping engagement with the finger grip strip 16.

The glare eliminator just described is intended for use during the night driving to protect a motorist from the dangerous glare of the headlights of approaching motor vehicles. In practice, the user inserts the little finger of the left hand through the small finger opening 17 and the three other fingers of the said hand through the opening 15. The device is next positioned with the finger grip 16 flat against the front side of the hand grip ring 18 of the steering wheel 19 at the top thereof, and as best seen in Figures 1, 2 and 3 of the drawing. When in this position, the device is securely held and projects above the steering wheel within the range of vision of the driver seated therebehind. As the headlights of an approaching vehicle come into view, the operator may slide the device 10 relative to the steering wheel in order to position the same within the range of the glaring lights. Due to the characteristics of the material from which the device is constructed, the presence of the device within the vision of the operator does not interfere with his view of the road ahead nor with the relative position of the approaching vehicle. After the approaching vehicle has passed and the road ahead is clear, the operator may permit the anti-glare device to remain in position and may peer through the peep opening 15 by merely shifting his head relative to the device.

Whereas I have specifically mentioned the device as intended for night driving, the same may also be used during daylight driving when the conditions of the road are such that a glare exists.

In view of the simplicity and inexpensive nature of the device, the same has ample space for the placing of an advertisement thereon, thus the device may be used as an article of advertising by an advertiser who may distribute the same among motorists.

In Figure 6 of the drawing, I have shown a slightly modified form, but instead of providing a single finger opening, there is provided three finger openings 17' for the three end fingers of the hand, whereas the larger opening 15' may receive the forefinger of the hand of the user. Extending downwardly from the top wall of the opening 15' are extension portions 20 from the anti-glare area and which extension portions may be brought into alinement with the two headlights of an approaching vehicle so that the lights just clear the peep opening 15' whereby the operator may by slight movement of his eyes, look through the opening 15' or shield the glare by means of the extension portions 20.

While I have shown and described what I consider to be the most practical embodiments of my invention, I wish it to be understood that such changes and alterations as come within the scope of the appended claims may be resorted to if desired.

Having thus described the invention, what I claim as new and desire to secure by Letters Patent of the United States, is:—

1. An anti-glare device comprising a flat semi-opaque body constructed of a single piece of material having an elongated peep opening therein adjacent its lower portion, the bottom wall of said opening being substantially parallel to the lower edge of said body to provide a hand grip portion by which the body may be supported in an eye shielding position by and forward of the operator of a motor vehicle while simultaneously grasping the steering wheel for steering purposes.

2. An anti-glare device for drivers of motor vehicles comprising a flat semi-opaque body formed of a single piece of material having a relatively large elongated peep opening therein adjacent the lower edge thereof and through which certain of the fingers of the hand of a user may be inserted, said body having one or more smaller openings therein disposed beyond one end of the elongated opening through which the remaining finger or fingers of the hand of a user may be inserted, substantially as and for the purpose specified.

3. A glare eliminator for the drivers of motor vehicles comprising a flat body formed from a single piece of semi-opaque flexible material having a slightly concaved bottom edge extending the length of said edge, said flat body having an elongated opening therein of a size greater than that which is necessary to receive the fingers of a human hand, the lower wall of said opening being disposed adjacent and substantially parallel to the bottom concave edge to provide an intervening hand grip portion therebetween adapted to be gripped by the hand of the driver of a motor vehicle when the fingers of the hand are inserted through said opening and for simultaneously grasping the steering wheel.

DAVID ELLIOTT.